US009872074B1

(12) United States Patent
Eliseo et al.

(10) Patent No.: US 9,872,074 B1
(45) Date of Patent: Jan. 16, 2018

(54) DETERMINING GAME MATURITY LEVELS AND STREAMING GAMING CONTENT TO SELECTED PLATFORMS BASED ON MATURITY LEVELS

(71) Applicant: INTERNATIONAL BUSINESS MACHINES CORPORATION, Armonk, NY (US)

(72) Inventors: Jordan A. Eliseo, Austin, TX (US); Yucong Feng, Austin, TX (US); Su Liu, Austin, TX (US); Andrew F. Ly, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/356,951

(22) Filed: Nov. 21, 2016

(51) Int. Cl.
| | |
|---|---|
| *H04N 7/16* | (2011.01) |
| *A63F 9/24* | (2006.01) |
| *A63F 13/00* | (2014.01) |
| *G06F 17/00* | (2006.01) |
| *G06F 19/00* | (2011.01) |
| *H04N 21/466* | (2011.01) |

(Continued)

(52) U.S. Cl.
CPC ....... *H04N 21/4667* (2013.01); *A63F 13/355* (2014.09); *A63F 13/79* (2014.09); *H04L 67/22* (2013.01); *H04N 21/44222* (2013.01); *H04N 21/454* (2013.01); *H04N 21/4532* (2013.01); *H04N 21/4627* (2013.01); *H04N 21/4758* (2013.01); *H04N 21/4781* (2013.01); *H04N 21/812* (2013.01); *H04N 21/8133* (2013.01); *H04L 67/10* (2013.01)

(58) Field of Classification Search
None
See application file for complete search history.

(56) References Cited

U.S. PATENT DOCUMENTS

| 9,392,313 | B2 * | 7/2016 | Bugenhagen | .......... G06Q 30/02 |
| 9,573,062 | B1 * | 2/2017 | Long | .................. A64F 13/5252 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — William J Kim
(74) *Attorney, Agent, or Firm* — William H. Hartwell; Andrew D. Wright; Roberts Mlotkowski Safran Cole & Calderon P.C.

(57) ABSTRACT

A computer-implemented method includes: receiving, by a computing device, gaming content and an instruction to stream the gaming content across multiple content streaming platforms; determining, by the computing device, a maturity rating of the gaming content; selecting, by the computing device, one or more content streaming platforms, of a plurality of content streaming platforms, for which to provide the gaming content for publishing or streaming via the one or more content streaming platforms, wherein the selected one or more content streaming platforms meet maturity criteria defined by each of the one or more content streaming platforms; and providing, by the computing device, the gaming content to the selected one or more content streaming platforms to cause the selected one or more content streaming platforms to publish the gaming content.

20 Claims, 7 Drawing Sheets

(51) Int. Cl.
*H04L 29/08* (2006.01)
*H04N 21/478* (2011.01)
*H04N 21/442* (2011.01)
*H04N 21/454* (2011.01)
*H04N 21/475* (2011.01)
*H04N 21/4627* (2011.01)
*H04N 21/45* (2011.01)
*H04N 21/81* (2011.01)
*A63F 13/355* (2014.01)
*A63F 13/79* (2014.01)

(56) References Cited

U.S. PATENT DOCUMENTS

| | | | |
|---|---|---|---|
| 9,620,173 B1* | 4/2017 | Fay | G11B 27/036 |
| 2002/0065678 A1* | 5/2002 | Peliotis | H04N 7/163 |
| | | | 725/35 |
| 2007/0169159 A1* | 7/2007 | Aaby | H04N 7/17318 |
| | | | 725/97 |
| 2007/0265073 A1 | 11/2007 | Novi et al. | |
| 2008/0081699 A1* | 4/2008 | Haeuser | A63F 13/12 |
| | | | 463/42 |
| 2009/0041311 A1* | 2/2009 | Hundley | H04N 21/4223 |
| | | | 382/118 |
| 2009/0144785 A1* | 6/2009 | Walker | G11B 27/034 |
| | | | 725/105 |
| 2009/0150444 A1* | 6/2009 | Cohen | G11B 27/034 |
| 2009/0182872 A1 | 7/2009 | Hong | |
| 2009/0187936 A1* | 7/2009 | Parekh | H04H 20/38 |
| | | | 725/25 |
| 2009/0249244 A1* | 10/2009 | Robinson | G06F 3/0481 |
| | | | 715/781 |
| 2009/0325712 A1 | 12/2009 | Rance | |
| 2009/0328087 A1* | 12/2009 | Higgins | H04N 7/173 |
| | | | 725/10 |
| 2010/0250703 A1* | 9/2010 | Steadman | G11B 27/034 |
| | | | 709/217 |
| 2011/0053693 A1 | 3/2011 | Wright | |
| 2011/0082807 A1* | 4/2011 | Parekh | G06Q 10/107 |
| | | | 705/319 |
| 2011/0107220 A1* | 5/2011 | Perlman | A63F 13/12 |
| | | | 715/720 |
| 2012/0117589 A1* | 5/2012 | Lee | H04N 21/4751 |
| | | | 725/28 |
| 2012/0246732 A1* | 9/2012 | Burton | G06F 17/30787 |
| | | | 726/26 |
| 2012/0278899 A1* | 11/2012 | Mahan | H04N 21/41407 |
| | | | 726/28 |
| 2013/0283401 A1* | 10/2013 | Pabla | G06F 21/60 |
| | | | 726/30 |
| 2014/0155171 A1* | 6/2014 | Laakkonen | G07F 17/3272 |
| | | | 463/42 |
| 2014/0274387 A1* | 9/2014 | Lewis | A63F 13/00 |
| | | | 463/31 |
| 2014/0281007 A1 | 9/2014 | Lemmons et al. | |
| 2015/0070516 A1* | 3/2015 | Shoemake | H04N 21/42203 |
| | | | 348/207.11 |
| 2015/0121437 A1* | 4/2015 | Tan | H04N 21/2187 |
| | | | 725/93 |
| 2015/0243078 A1* | 8/2015 | Watson | A63F 13/26 |
| | | | 345/547 |
| 2015/0304697 A1* | 10/2015 | Trombetta | A63F 13/00 |
| | | | 725/116 |
| 2016/0164934 A1* | 6/2016 | Hendon, III | H04L 65/4076 |
| | | | 705/44 |
| 2016/0171520 A1* | 6/2016 | Waters | G06Q 30/0224 |
| | | | 705/14.25 |
| 2016/0234276 A1* | 8/2016 | Ouyang | H04L 65/403 |
| 2016/0287997 A1* | 10/2016 | Laakkonen | A63F 13/00 |
| 2017/0093769 A1* | 3/2017 | Lind | G06F 3/0481 |
| 2017/0093943 A1* | 3/2017 | Alsina | H04L 65/60 |

OTHER PUBLICATIONS

Entertainment Software Rating Board (ESRB), http://www.esrb.org/, Accessed Nov. 18, 2016, 1 page.
restream.io, https://restream.io/, Accessed Nov. 18, 2016, 1 page.
joicaster.co, https://www.joicaster.co/, Accessed Nov. 18, 2016, 1 page.
Soper, "Xbox One will penalize you for cursing while playing sports games", http://www.geekwire.com/2013/xbox-kinect-hear-curse-playing-nba-2k14/, Dec. 3, 2013, 8 pages.

* cited by examiner

DETERMINING GAME MATURITY LEVELS AND STREAMING GAMING CONTENT TO SELECTED PLATFORMS BASED ON MATURITY LEVELS

BACKGROUND

The present invention generally relates to streaming gaming content to streaming platforms and, more particularly, to determining game maturity levels and streaming gaming content to selected platforms based on maturity levels.

Content streaming platforms may be used to stream live or pre-recorded game play for viewing by interested viewers. For example, a user may access a content streaming platform from a client device (e.g., a desktop/laptop computer, a game console, a mobile device, etc.) and provide live gaming content to the content streaming platform for streaming an audio/video feed of the user's game play as it occurs in real-time. Streamed gaming content may also include live user audio commentary.

SUMMARY

In an aspect of the invention, a computer-implemented method includes: receiving, by a computing device, gaming content and an instruction to stream the gaming content; determining, by the computing device, a maturity rating of the gaming content; selecting, by the computing device, one or more content streaming platforms, of a plurality of content streaming platforms, for which to provide the gaming content for publishing or streaming via the one or more content streaming platforms based on the maturity rating; and providing, by the computing device, the gaming content to the selected one or more content streaming platforms to cause the selected one or more content streaming platforms to publish the gaming content.

In an aspect of the invention, there is a computer program product for streaming gaming content. The computer program product includes a computer readable storage medium having program instructions embodied therewith, the program instructions executable by a computing device to cause the computing device to: receive gaming content and an instruction to stream the gaming content across a plurality of content streaming platforms; determine a maturity rating of the gaming content; compare the maturity rating of the gaming content with highest permitted maturity ratings associated with each of the plurality of content streaming platforms; select a subset of the plurality of content streaming platforms whose permitted maturity ratings satisfy the maturity rating of the gaming content based on the comparing; and provide the gaming content to the selected subset of content streaming platforms to cause the selected subset of content streaming platforms to publish the gaming content.

In an aspect of the invention, a system includes: a CPU, a computer readable memory and a computer readable storage medium associated with a computing device; program instructions to receive gaming content and an instruction to stream the gaming content across a plurality of content streaming platforms; program instructions to determine a maturity rating of the gaming content based on the presence of mature content in the game and mature content in user commentary included in the gaming content; program instructions to select a subset of the plurality of content streaming platforms whose permitted maturity ratings satisfy the maturity rating of the gaming content; and program instructions to provide the gaming content to the selected subset of content streaming platforms to cause the selected subset of content streaming platforms to publish the gaming content. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
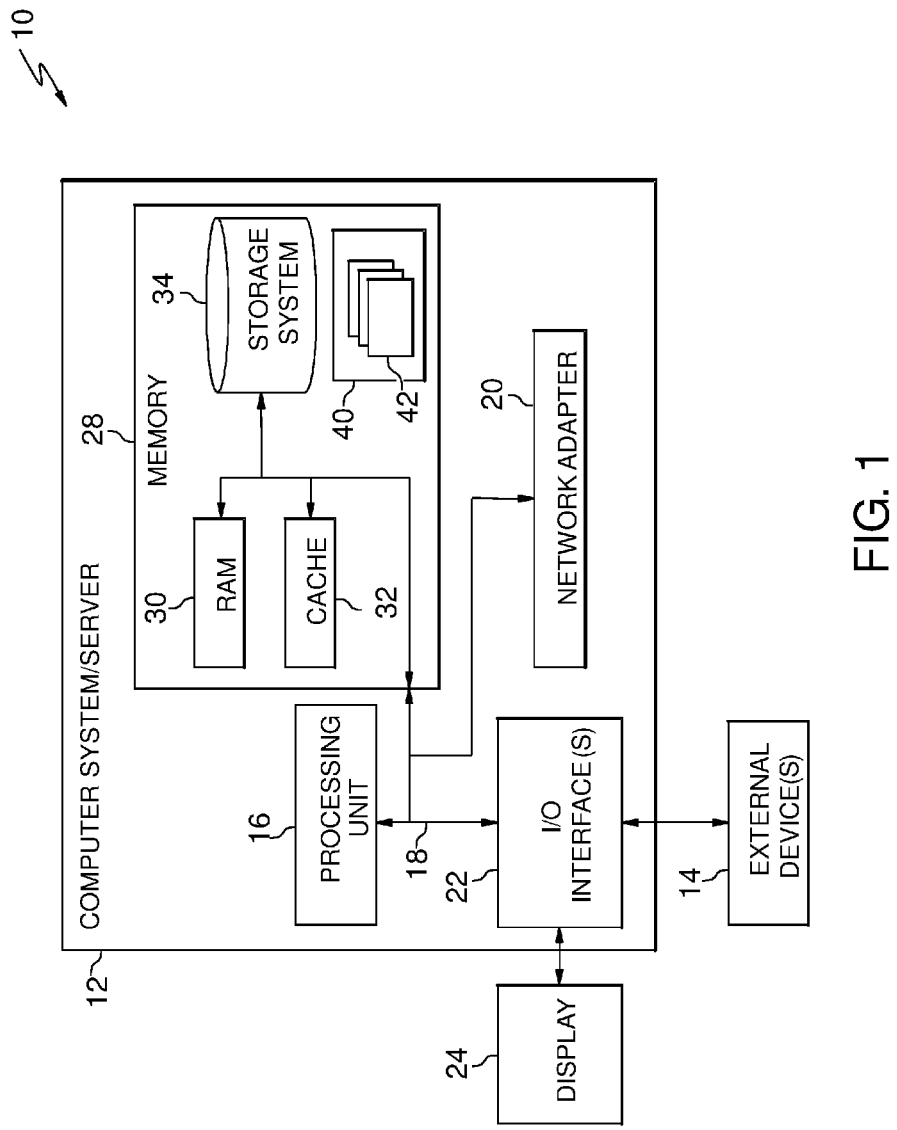
FIG. 1 depicts a cloud computing node according to an embodiment of the present invention.

The present invention generally relates to streaming gaming content to streaming platforms and, more particularly, to determining game maturity levels and streaming gaming content to selected platforms based on maturity levels. To maximize viewership of streaming gaming content, a user may wish to stream gaming content (e.g., live or pre-recorded game play) across multiple content streaming platforms. However, streaming gaming content across multiple content streaming platforms may pose technical challenges as well as inconvenience to the user. For example, in order for the user to stream to multiple content streaming platforms, the user may need to browse to different websites for each content streaming platform to upload streaming content. Further, the client device would need to upload multiple streams of the same content, thereby placing additional strain on the client device and network of the client device, thus adversely affecting performance of the client. This can be particularly problematic when streaming gaming content since games often require a substantial amount of computing power to run properly.

Streaming gaming content across multiple content streaming platforms may be further problematic since different content streaming platforms may permit different maturity levels of content to be streamed based on the terms and conditions of each content streaming platform. For example, one content streaming platform may allow content of any maturity level to be streamed, whereas a different content streaming platform may wish to restrict content of higher maturity levels (e.g., content with violence, profane language, etc.) from being streamed from their platform. Accordingly, aspects of the present invention provide a system and/or method to automate streaming of content across multiple platforms while also adhering to the terms and conditions for each streaming platform.

As described herein, a user may provide gaming content to a content platform selection server for streaming content across multiple content streaming platforms. The content platform selection server may automatically determine a maturity level of the gaming content, select content streaming platforms whose terms and services permit the maturity level, and provide the content to the selected content streaming platforms. As an example, the content streaming platform may determine a maturity level for gaming content based as "Mature" and may select content streaming platforms that permit "Mature" level content to be streamed without selecting those content streaming platforms that do not permit "Mature" level content to be streamed. In this way, content is only provided to content streaming platforms that permit the content to be streamed based on individual terms and conditions for each content streaming platform.

As described in greater detail herein, gaming content maturity levels may be determined based on various factors, such as game title information, audio/video data from the gaming content, pixel-based classification and object detection from images/video from the gaming content, audio and/or video user commentary, prior maturity level information, prior user audio commentary, user gaming profile information, user gaming history information, etc. Maturity levels may correspond to descriptive narratives, such as those established by a ratings board (e.g., the Entertainment Software Ratings Board (ESRB)). Additionally, or alternatively, maturity levels may be represented in the form of a numerical score on a scale.

As described in greater detail herein, gaming activity may be monitored and maturity levels of the gaming content may be updated based on detecting a change in the gaming content (e.g., when a user switches to another game). Based on updating the maturity level, the selection of content streaming platforms may also be updated. When gaming activity ends, content streaming may be discontinued.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
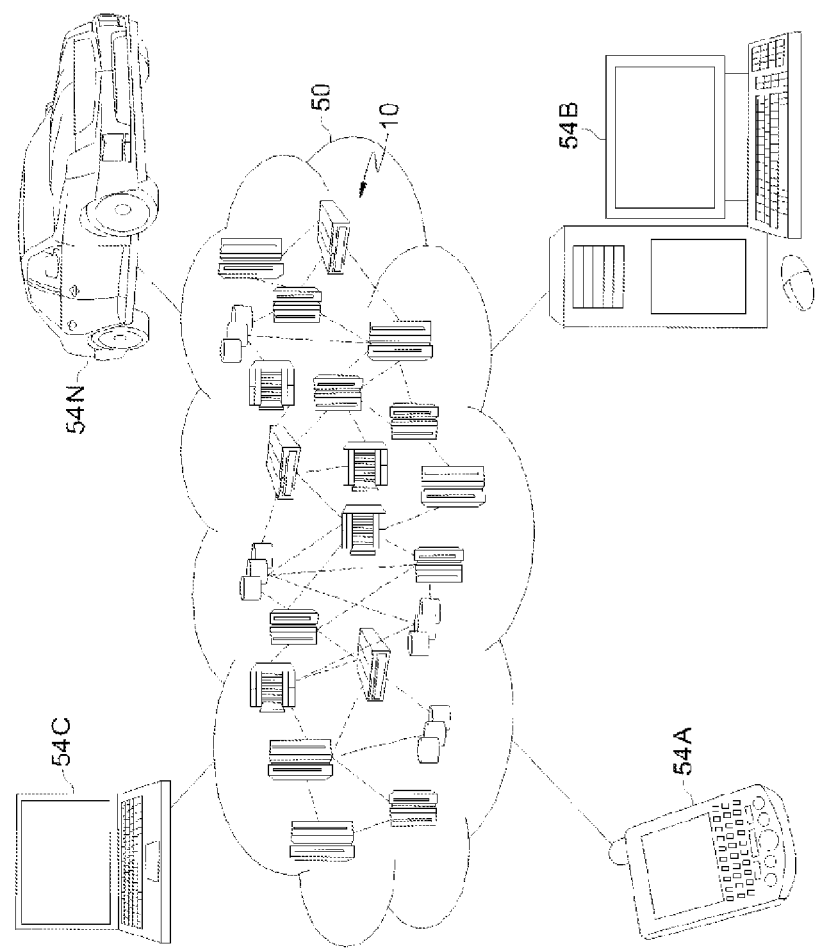
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
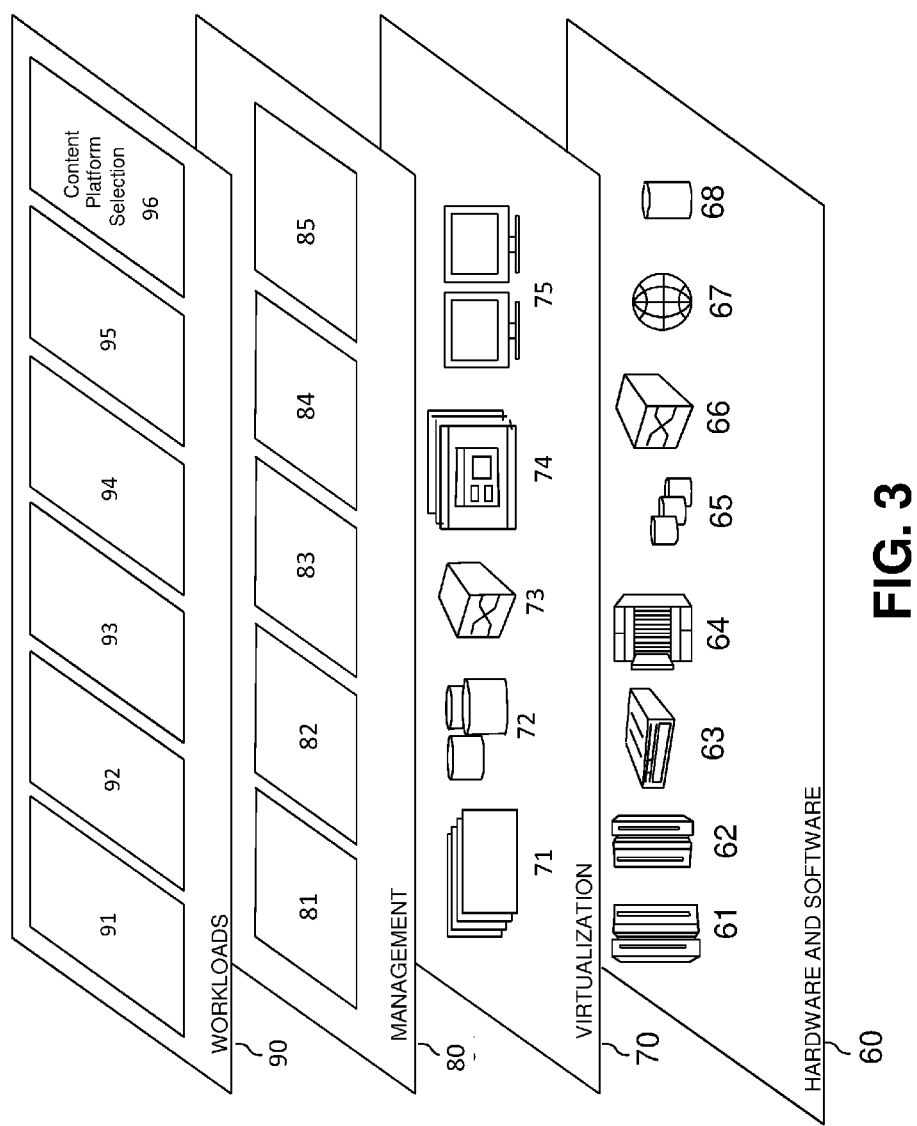
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content platform selection 96.

Referring back to FIG. 1, the program/utility 40 may include one or more program modules 42 that generally carry out the functions and/or methodologies of embodiments of the invention as described herein (e.g., such as the functionality provided by content platform selection 96). Specifically, the program modules 42 may determine a maturity rating for gaming content, identify streaming platforms that permit gaming content of the determined maturity rating, provide the content for streaming to the identified platforms, monitor gaming activity, update maturity levels based on detecting a change in the gaming content, and update which platforms to provide the gaming content for streaming based on the updated maturity levels. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a client device 210 as shown in FIG. 4.

Figure 4:
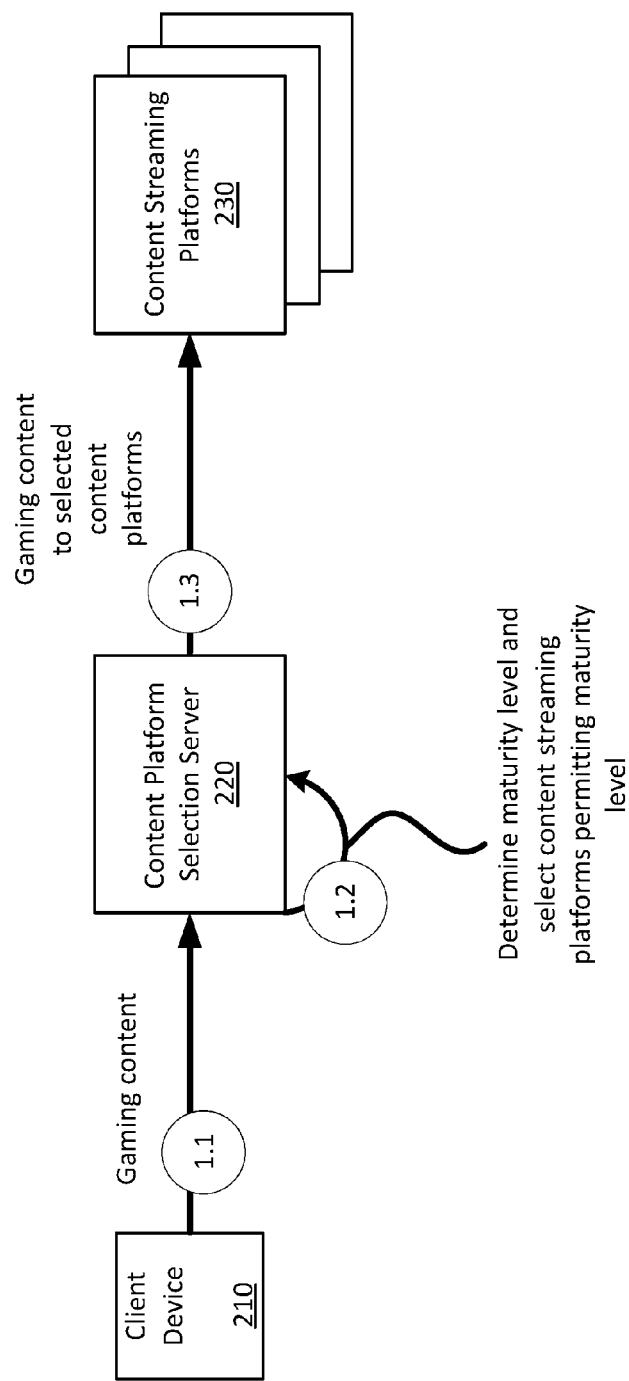
FIG. 4 shows an overview of an example implementation in accordance with aspects of the present invention.

FIG. 4 shows an overview of an example implementation in accordance with aspects of the present invention. As shown in FIG. 4, a client device 210 may provide gaming content to a content platform selection server 220 for streaming (step 1.1). For example, a user of the client device 210 may access the content platform selection server 220 (e.g., via an application, web page, etc.) and provide an instruction for the content platform selection server 220 to stream gaming content across multiple content streaming platforms 230. Based on receiving the gaming content, the content platform selection server 220 may determine a maturity level of the gaming content (e.g., based on at least one of: application information corresponding to the game, game title information input by the user, audio/video data from the gaming content, pixel-based classification and object detection from images/video from the gaming content, audio and/or video user commentary, prior maturity level information, prior user audio commentary, user gaming profile information, user gaming history information, etc.).

As described herein, user commentary may include voiceovers to gameplay, and may further include a video feed of the user (and the user's reaction) that is provided within a video of gameplay (e.g., in a picture-in-picture format in which the user's video is presented within a video of the gameplay). In embodiments, the content platform selection server 220 may determine a maturity level of the gaming content based on the content of the user's commentary. For example, the content platform selection server 220 may use speech recognition techniques to identify words spoken in the user commentary and/or the tone of the user's commentary, and may determine the maturity level based on this content within the user commentary. Additionally, or alternatively, the content platform selection server 220 may use video analysis techniques to identify the content and maturity level from video user commentary. For example, the content platform selection sever 220 may determine the maturity level based on object detection, gesture detection, etc. In embodiments, the content platform selection sever 220 may determine the maturity level based on user commentary as a stand-alone variable (e.g., independently of the game content itself).

The content platform selection server 220 may determine a maturity level in the form of a description, such as those corresponding to an ESRB rating. Additionally, or alternatively, the content platform selection server 220 may determine a numerical maturity rating (e.g., a numerical rating on a scale, such as a scale form 0-10 in which 10 is the highest level of maturity).

The content platform selection server 220 may select content streaming platforms 230 that permit the maturity level. In other words, the content platform selection server 220 may select only content streaming platforms 230 meeting maturity level criteria. As an example, the content streaming platform may determine a maturity level for gaming content based as "Mature" and may select content streaming platforms that permit "Mature" level content to be streamed without selecting those content streaming platforms that do not permit "Mature" level content to be streamed. Based on selecting the content streaming platforms 230, the content platform selection server 220 may provide gaming content to the selected content platform servers 230 for streaming the content, and the selected content streaming platforms 230 may publish the content for broadcasting/streaming. In this way, content is only provided to content streaming platforms that permit the content to be streamed based on individual terms and conditions for each content streaming platform.

Figure 5:
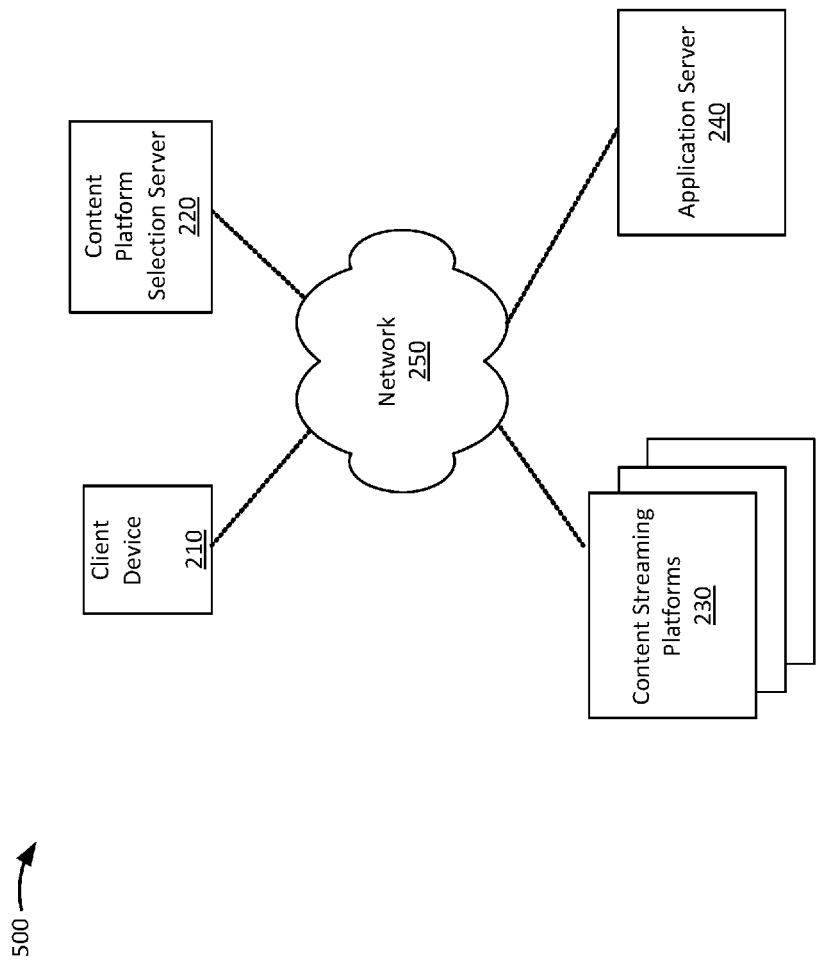
FIG. 5 shows an example environment in accordance with aspects of the present invention.

FIG. 5 shows an example environment in accordance with aspects of the present invention. As shown in FIG. 5, environment 500 may include a client device 210, a content platform selection server 220, content streaming platforms 230, application server 240, and/or a network 250. In embodiments, one or more components in environment 500 may correspond to one or more components in the cloud computing environment of FIG. 2. In embodiments, one or more components in environment 500 may include the components of the computer system/server 12 of FIG. 1.

The client device 210 may include a device capable of communicating via a network, such as the network 250. For example, the client device 210 may correspond to a desktop computing device, a portable computer device (e.g., a laptop or a tablet computer), a gaming console, a mobile communication device (e.g., a smart phone or a personal digital assistant (PDA)), a set-top box, or another type of computing device. As described herein, a user may use the client device 210 for streaming gaming content of the user's live or pre-recorded game play via the content platform selection server 220 and the content streaming platforms 230. In embodiments, the client device 210 may communicate with the application server 240 to facilitate and execute the operations of a gaming application (e.g., for online, multi-player, and/or cloud-based games).

The content platform selection server 220 may include one or more computing devices that may determine a maturity rating for gaming content, identify content streaming platforms 230 that permit gaming content of the determined maturity rating based on the terms and conditions of each content streaming platform 230, and provide the content for streaming to the identified platforms. The content platform selection server 220 may host an application, web portal, or the like via which a user of client device 210 may provide an instruction/request to stream content to multiple different content streaming platforms 230. In this way, the content platform selection server 220 serves as a single gateway for providing streaming gaming content to multiple different content streaming platforms 230 to maximize viewership without violating the terms and conditions of individual content streaming platforms 230. Additionally, or alternatively, the content platform selection server 220 may monitor gaming activity, update maturity levels based on detecting a change in the gaming content, and update which content streaming platforms 230 to provide the gaming content for streaming based on the updated maturity levels (e.g., discontinue streaming content to certain content streaming platforms 230 when the maturity level changes). Additionally, or alternatively, the content platform selection sever 220 may continuously monitor user commentary and discontinue streaming of content when the user commentary causes the maturity level to change.

The content streaming platforms 230 may each include one or more computing devices that host streaming content for viewing. Each content streaming platform 230 may be associated with a set of terms and conditions that define maturity levels for content that may be streamed. Content streaming platform 230 may receive content for streaming from the content platform selection server 220.

The application server 240 may include one or more server devices that host a gaming application and/or support the functionality of gaming applications. For example, the application server 240 may connect multiple players together for multiplayer gaming. Additionally, or alternatively, the application server 240 may store gaming information, user profiles, virtual goods, gaming progress, game states, etc. for different users/players.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
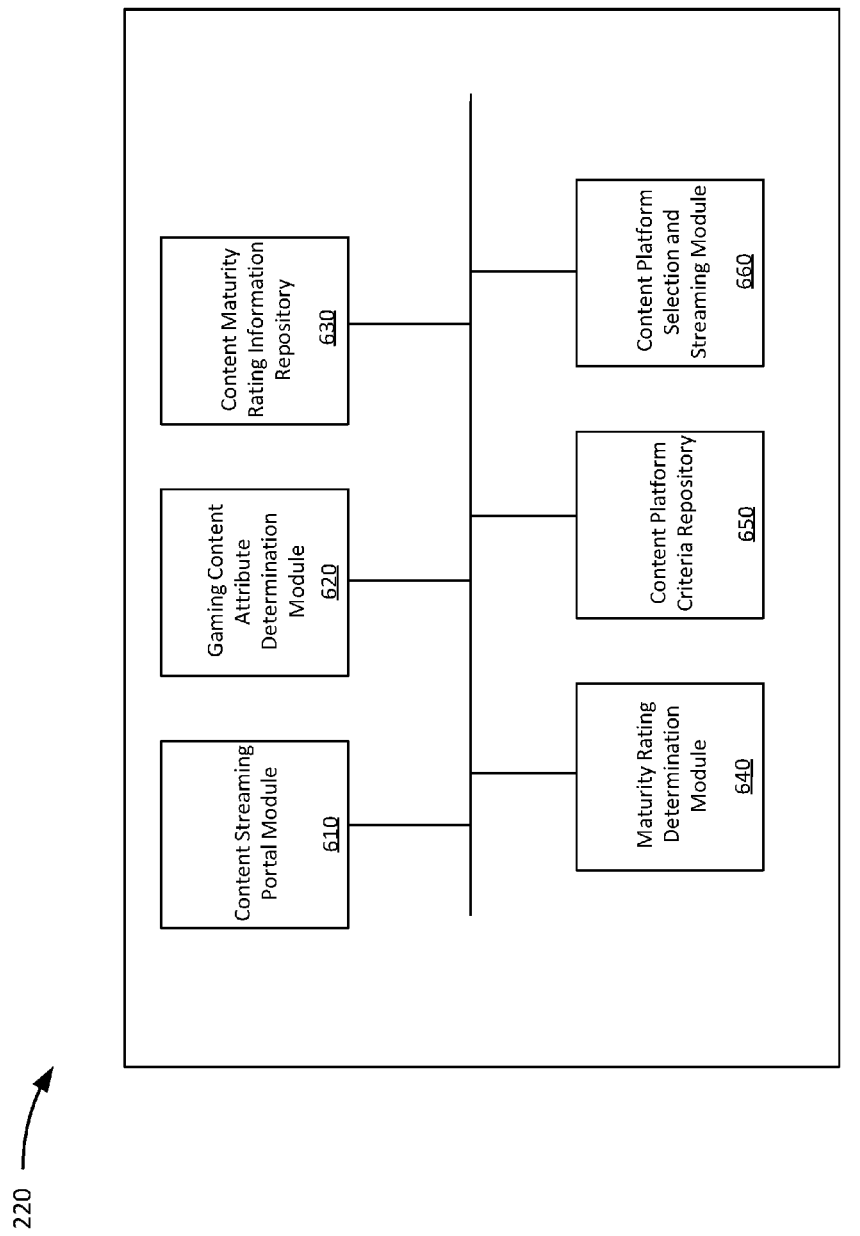
FIG. 6 shows a block diagram of example components of a content platform selection server in accordance with aspects of the present invention.

FIG. 6 shows a block diagram of example components of a content platform selection server 220 in accordance with aspects of the present invention. As shown in FIG. 6, the content platform selection server 220 may include a content streaming portal module 610, a gaming content attribute determination module 620, a content maturity rating information repository 630, a maturity rating determination module 640, a content platform criteria repository 650, and a content platform selection and streaming module 660. In embodiments, the content platform selection server 220 may include additional or fewer components than those shown in FIG. 6. In embodiments, separate components may be integrated into a single computing component or module. Additionally, or alternatively, a single component may be implemented as multiple computing components or modules.

The content streaming portal module 610 may include a program module (e.g., program module 42 of FIG. 1) that receives an instruction (e.g., from client device 210) to stream gaming content (e.g., live or pre-recorded game play) to multiple content streaming platforms 230. The content streaming portal module 610 may receive the instruction via an application and/or web portal hosted by the content streaming portal module 610. The instruction may identify a source of the content and/or attributes of the content (e.g., game title, etc.). For example, the user of the client device 210 may select to stream a file having pre-recorded game play. Additionally, or alternatively, the user may select to live stream game play from a gaming application running on the client device 210, or to live stream the entire desktop of the client device 210. The user may also select to stream user commentary (e.g., text commentary and/or audio commentary).

The gaming content attribute determination module 620 may include a program module (e.g., program module 42 of FIG. 1) that determines the attributes of the gaming content identified in the instruction received by the content streaming portal module 610 to be streamed. In embodiments, the gaming content attribute determination module 620 may determine the gaming content to be streamed based on the user-defined source. For example, if the source of the content includes the user's desktop, the content streaming portal module 610 may determine that the content to be streamed is a gaming application in the foreground of the desktop.

The gaming content attribute determination module 620 may also determine the attributes of the content such as game title, and whether the content includes profane language, violence, etc. In embodiments, the gaming content attribute determination module 620 may determine the attributes of the content based on, for example, information provided by the user (e.g., game title), application information (e.g., application name, application package data, application metadata, etc.), computer processing activity information (e.g., memory usage, CPU usage, etc.); user gaming profile information, user gaming history information, user commentary history information, etc. Additionally, or alternatively, the gaming content attribute determination module 620 may determine the attributes of the content based on pixel-based classification techniques, object recognition techniques, audio/speech recognition techniques, or the like. For example, the gaming content attribute determination module 620 may determine whether the content includes profane language (e.g., either in the game itself or in the user commentary) based on speech recognition techniques. Additionally, or alternatively, the gaming content attribute determination module 620 may determine whether the content includes violence based on object detection, video/image analysis, audio analysis, etc. For live-stream content, the gaming content attribute determination module 620 may analyze the content as the content is received from the client device in real time to determine the attributes of the content (e.g., based on audio/video/image analysis as described above). For pre-recorded content, the gaming content attribute determination module 620 may analyze a file having the content to determine the content attributes.

The content maturity rating information repository 630 may include a data storage device (e.g., storage system 34 of FIG. 1) that stores information regarding content ratings information based on the content attributes. For example, the content maturity rating information repository 630 may store ratings information (e.g., ESRB ratings) based on game titles. Additionally, or alternatively, the content maturity rating information repository 630 may store information that may be used to determine maturity ratings based on attributes. For example, content maturity rating information repository 630 may store a data structure indicating scores/weightings for content with profane language, violence, etc.

The maturity rating determination module 640 may include a program module (e.g., program module 42 of FIG. 1) that determines a maturity rating for content based on the content attributes and the information stored by the content maturity rating information repository 630. For example, the maturity rating determination module 640 may map the game title (determined by the gaming content attribute determination module 620) to the ESRB rating (stored by the content maturity rating information repository 630). Additionally, or alternatively, the maturity rating determination module 640 may generate a numerical rating by combining content attribute information with the scores/weightings information stored by the content maturity rating information repository 630. In embodiments, the maturity rating may match ESRB rating or the ESRB rating may be one variable in generating a numerical maturity rating for the content. In embodiments, the maturity rating determination module 640 may determine multiple different maturity ratings (e.g., one rating for gaming content and another for user commentary).

The content platform criteria repository 650 may include a data storage device (e.g., storage system 34 of FIG. 1) that stores information regarding criteria for each content streaming platform 230 to determine which content streaming platforms 230 to stream the content. More specifically, the content maturity rating information repository 630 may store a data structure mapping each content streaming platform 230 with the permitted maturity levels.

The content platform selection and streaming module 660 may select which content streaming platforms 230 to stream the content based on the maturity information (as determined by the maturity rating determination module 640) and the content platform criteria information (stored by the content platform criteria repository 650). For example, the content platform selection and streaming module 660 may select to stream the content to those content streaming platforms 230 that permit content with the determined maturity rating. The content platform selection and streaming module 660 may stream the content to the selected content streaming platforms 230. In this way, the content platform selection server 220 serves as a single gateway for providing streaming gaming content to multiple different content streaming platforms 230 to maximize viewership without violating the terms and conditions of individual content streaming platforms 230.

Figure 7:
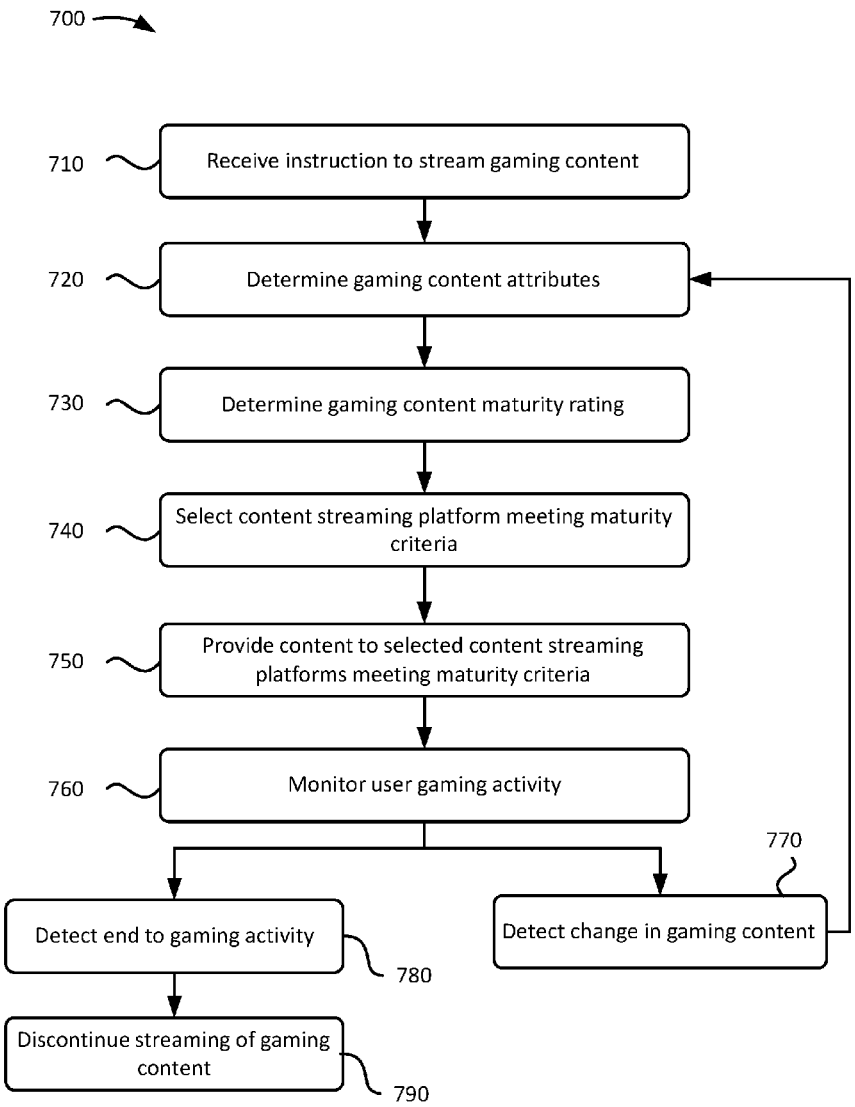
FIG. 7 shows an example flowchart for streaming content to multiple different content streaming platforms based on permitted maturity ratings by each individual content streaming platform in accordance with aspects of the present invention.

FIG. 7 shows an example flowchart for streaming content to multiple different content streaming platforms 230 based on permitted maturity ratings by each individual content streaming platform 230. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 may include receiving an instruction to stream gaming content (step 710). For example, as described above with respect to the content streaming portal module 610, the content platform selection server 220 may receive the instruction via an application and/or web portal hosted by the content platform selection server 220.

Process 700 may also include determining gaming content attributes (step 720). For example, as described above with respect to the gaming content attribute determination module 620, the content platform selection server 220 may determine the attributes of the content such as game title, and whether the content includes profane language, violence, etc. In embodiments, the content platform selection server 220 may determine the attributes of the content based on, for example, information provided by the user (e.g., game title), application information (e.g., application name, application package data, application metadata, etc.), user gaming profile information, user gaming history information, user commentary history information, etc. Additionally, or alternatively, the content platform selection server 220 may determine the attributes of the content based on pixel-based classification techniques, object recognition techniques, audio/speech recognition techniques, or the like. For live streaming content, the content platform selection server 220 may determine the attributes in real-time.

Process 700 may further include determining gaming content maturity rating (step 730). For example, as described above with respect to the maturity rating determination module 640, the content platform selection server 220 may determine a maturity rating for content based on the content attributes and the information stored by the content maturity rating information repository 630. For example, the content platform selection server 220 may map the game title (determined by the gaming content attribute determination module 620) to the ESRB rating (stored by the content maturity rating information repository 630). Additionally, or alternatively, the content platform selection server 220 may generate a numerical rating by combining content attribute information with the scores/weightings information stored by the content maturity rating information repository 630. In embodiments, the maturity rating may match ESRB rating or the ESRB rating may be one variable in generating a numerical maturity rating for the content.

Process 700 may also include selecting content streaming platforms meeting maturity criteria (step 740) and providing the content to content streaming platforms meeting the maturity criteria. For example, as described above with respect to the content platform selection and streaming module 660, the content platform selection server 220 may select which content streaming platforms 230 to stream the content based on the maturity information (as determined by the maturity rating determination module 640) and the content platform criteria information (stored by the content platform criteria repository 650). For example, the content platform selection server 220 may select to stream the content to those content streaming platforms 230 that permit content with the determined maturity rating. In other words, the content platform selection server 220 may compare the maturity rating of the content with the highest permitted maturity rating of each content streaming platform 230 and select the content streaming platforms 230 whose permitted maturity ratings satisfy the maturity rating of the content (e.g., when the highest permitted maturity ratings are equal to or less than the maturity rating of the content). The content platform selection server 220 may stream the content to the selected content streaming platforms 230. Further, the content platform selection server 220 may prevent the content from being streamed to content streaming platforms 230 that do not permit the content based on the maturity rating.

Process 700 may further include monitoring user gaming activity (step 760). For example, the content platform selection server 220 may monitor the gaming activity of the client device 210. In embodiments, the content platform selection server 220 may detect a change in gaming content (step 770). For example, the content platform selection server 220 may detect a change in gaming content when the user switches game play to a different game (e.g., when the user changes applications, changes gaming media, etc.). When a change in gaming content is detected, process 700 may return to step 720 in which attributes of the gaming content is again determined, the content maturity rating is updated (step 730), which content streaming platforms 230 are selected for streaming the content are updated (step 740), and the content is provided to the selected content streaming platforms 230 (step 750). In embodiments, the content platform selection server 220 may continuously monitor live user commentary in a live-stream, update the maturity rating based on the live user commentary, and accordingly update the selected content streaming platforms 230 for which to provide the content based on the updated maturity rating. For example, as described herein, speech recognition techniques may be used to identify spoken words/tones from the user commentary, and determine the maturity level accordingly. As described herein, different maturity ratings may be determined for user commentary and for game play. Thus, in an embodiment, the content platform selection server 220 may discontinue providing user commentary while still providing video of game play for streaming.

Alternatively, based on the monitoring, the content platform selection server 220 may detect an end to the gaming activity (step 780), such as when a connection between the client device 210 and content platform selection server 220 is discontinued, when a gaming application is closed, and/or when no gaming activity has transpired for a threshold period of time. In this case, process 700 may include discontinuing streaming of the gaming content.

As described herein, a single gateway provided by the content platform selection server 220 may be used to provide content to multiple content streaming platforms 230, thereby streamlining the user's experience by eliminating the need for the user to access each individual content streaming platform 230 for streaming content. Further, content is only provided to content streaming platforms 230 that permit the content to be streamed based on individual terms and conditions for each content streaming platform.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, gaming content and an instruction to stream the gaming content;
   determining, by the computing device, a maturity rating of the gaming content;
   selecting, by the computing device, one or more content streaming platforms, of a plurality of content streaming platforms, for which to provide the gaming content for publishing or streaming via the one or more content streaming platforms based on the maturity rating; and providing, by the computing device, the gaming content to the selected one or more content streaming platforms to cause the selected one or more content streaming platforms to publish the gaming content.

2. The method of claim 1, wherein the gaming content includes live or real-time game play of a computer-implemented game.

3. The method of claim 1, further comprising determining attributes of the gaming content, wherein the determining the maturity rating is based on the attributes of the gaming content.

4. The method of claim 3, wherein the determining the attributes of the gaming content is based on at least one factor selected from a group consisting of:
pixel-based classification;
video analysis;
object detection;
audio analysis;
speech recognition;
application data analysis;
computer processing activity analysis;
user gaming profile information;
user gaming history information;
user commentary history information; and
user activity information.

5. The method of claim 1, wherein:
the gaming content includes user commentary; and
the determining the maturity rating is based on the user commentary.

6. The method of claim 5, further comprising:
monitoring the user commentary;
updating the maturity rating based on monitoring the user commentary;
selecting an updated subset of content streaming platforms based on the updated maturity rating; and
providing the changed gaming content to the updated subset of content streaming platforms.

7. The method of claim 1, further comprising:
monitoring user gaming activity;
detecting a change in gaming content based on the monitoring the user activity;
updating the maturity rating based on detecting the change;
selecting an updated subset of content streaming platforms based on the updated maturity rating; and
providing the changed gaming content to the updated subset of content streaming platforms.

8. The method of claim 1, wherein the maturity rating is a narrative description.

9. The method of claim 1, wherein the maturity rating is a numerical value.

10. The method of claim 1, wherein a service provider at least one of creates, maintains, deploys and supports the computing device.

11. The method of claim 1, wherein steps of claim 1 are provided by a service provider on a subscription, advertising, and/or fee basis.

12. The method of claim 1, wherein the computing device includes software provided as a service in a cloud environment.

13. The method of claim 1, further comprising deploying a system for streaming gaming content to multiple content streaming platforms in accordance with maturity rating criteria of the multiple content streaming platforms, comprising providing a computer infrastructure operable to perform the steps of claim 1.

14. A computer program product for streaming gaming content, the computer program product comprising a computer readable storage medium having program instructions embodied therewith, the program instructions executable by a computing device to cause the computing device to:
receive gaming content and an instruction to stream the gaming content across a plurality of content streaming platforms;
determine a maturity rating of the gaming content;
compare the maturity rating of the gaming content with highest permitted maturity ratings associated with each of the plurality of content streaming platforms;
select a subset of the plurality of content streaming platforms whose permitted maturity ratings satisfy the maturity rating of the gaming content based on the comparing; and
provide the gaming content to the selected subset of content streaming platforms to cause the selected subset of content streaming platforms to publish the gaming content.

15. The computer program product of claim 14, wherein the gaming content includes live or real-time game play of a computer-implemented game.

16. The computer program product of claim 14, wherein the maturity rating of the gaming content is based on at least one factor selected from a group consisting of:
pixel-based classification;
video analysis;
object detection;
audio analysis;
speech recognition;
application data analysis;
computer processing activity analysis;
user gaming profile information;
user gaming history information;
user commentary history information; and
user activity information.

17. The computer program product of claim 14, wherein:
the gaming content includes user commentary; and
the determining the maturity rating is based on the user commentary.

18. The computer program product of claim 14, wherein the program instructions further cause the computing device to:
monitor user gaming activity;
detect a change in gaming content based on the monitoring the user activity;
update the maturity rating based on detecting the change;
select an updated subset of content streaming platforms based on the updated maturity rating; and
provide the changed gaming content to the updated subset of content streaming platforms.

19. A system comprising:
a CPU, a computer readable memory and a computer readable storage medium associated with a computing device;
program instructions to receive gaming content and an instruction to stream the gaming content across a plurality of content streaming platforms;
program instructions to determine a maturity rating of the gaming content based on the presence of mature content in the game and mature content in user commentary included in the gaming content;

program instructions to select a subset of the plurality of content streaming platforms whose permitted maturity ratings satisfy the maturity rating of the gaming content; and program instructions to provide the gaming content to the selected subset of content streaming platforms to cause the selected subset of content streaming platforms to publish the gaming content, wherein the program instructions are stored on the computer readable storage medium for execution by the CPU via the computer readable memory.

20. The system of claim 19, wherein the maturity rating of the gaming content is based on at least one factor selected from a group consisting of:

pixel-based classification;
video analysis;
object detection;
audio analysis;
speech recognition;
application data analysis;
computer processing activity analysis;
user gaming profile information;
user gaming history information;
user commentary history information; and
user activity information.

* * * * *